Figure 1:
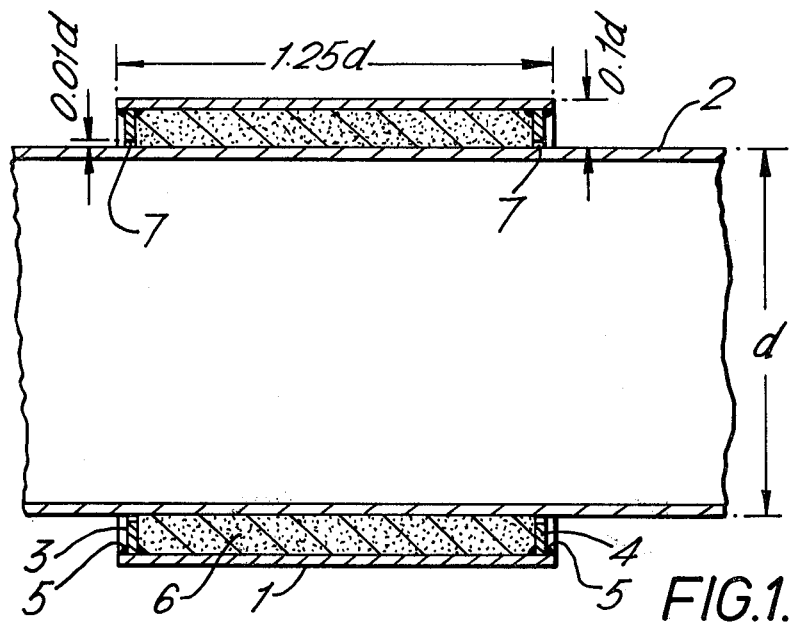

United States Patent [19]

Jude et al.

[11] 4,176,691
[45] Dec. 4, 1979

[54] APPARATUS FOR ARRESTING PROPAGATING FRACTURES IN PIPELINES

[75] Inventors: Dennis W. Jude, Corbridge; Joseph S. Bell, Blyth, both of England

[73] Assignee: British Gas Corporation, London, England

[21] Appl. No.: 897,127

[22] Filed: Apr. 17, 1978

Related U.S. Application Data

[63] Continuation of Ser. No. 646,542, Jan. 5, 1976, abandoned.

[30] Foreign Application Priority Data

Jan. 22, 1975 [GB] United Kingdom .................. 2722/75

[51] Int. Cl.² ............................................. F16L 57/00
[52] U.S. Cl. .................................. 138/103; 138/172; 138/178
[58] Field of Search .................. 138/99, 112, 113, 115, 138/103, 121, 122, 149, 172, 174, 178

[56] References Cited

U.S. PATENT DOCUMENTS

| 12,703 | 10/1807 | Corcoran | 138/99 X |
|---|---|---|---|
| 213,558 | 3/1879 | Field et al. | 138/178 X |
| 1,671,679 | 5/1928 | Marston | 138/175 X |
| 2,041,911 | 5/1936 | Ericson | 138/178 |
| 3,439,945 | 4/1969 | Chambers et al. | 138/99 X |
| 3,457,963 | 7/1969 | Hardwick | 138/172 |
| 3,605,046 | 9/1971 | Miller | 138/172 X |
| 3,850,714 | 11/1974 | Adorjan | 138/149 X |
| 3,860,039 | 1/1975 | Ells | 138/103 |
| 3,860,043 | 1/1975 | Kutnyak et al. | 138/172 X |
| 3,930,568 | 1/1976 | Levey | 138/149 X |

FOREIGN PATENT DOCUMENTS 56387  7/1939  Denmark .................................. 138/172

Primary Examiner—Harry N. Haroian
Assistant Examiner—James E. Bryant, III
Attorney, Agent, or Firm—Larson, Taylor and Hinds

[57] ABSTRACT

A device for arresting the propagation of a crack, split or fracture in a pipeline comprises a cylindrical sleeve of greater diameter than the pipeline and having an annular and end plate fixed at each end thereof, the assembly thus formed being arranged to be positioned around the pipeline so as to define an annular space therebetween which may be filled with grout material of high compressive strength.

1 Claim, 5 Drawing Figures

APPARATUS FOR ARRESTING PROPAGATING FRACTURES IN PIPELINES

This is a continuation of application Ser. No. 646,542 filed Jan. 5, 1976, now abandoned.

This invention relates to devices for the arresting of propagating fractures in pipelines pressurised with fluids, and particularly gaseous fluids.

To safeguard against the extensive destruction of pipelines carrying pressurised gas, arising from the phenomena of shear fracture propagation, past and present day practice has been to ensure that the manufacturing specification for the pipe must quantify adequate fracture toughness values. There is the possibility that future pipelines will be constructed not only in higher grades of material, bigger diameters, thiner wall thicknesses and operating at higher circumferential stresses than those previously used, but also they will be operative in a more hostile environment, for example, tens of degrees of front or submerged to considerable depths in sea water.

All of these parameters are thought important in the phenomena of fracture propagation in that the gas dynamics affecting the splitting open of the pipe and any surrounding media resistance to this, are changed. These changes may adversely affect the economics of the pipeline in that the predicted specified toughness is increased to a level which cannot be met without incurring a substantial financial penalty above those costs associated with small toughness variations in lesser tough pipes.

An object of the present invention is to provide an improved method and apparatus designed to arrest a propagating fracture in a pipeline constructed with material which does not normally possess sufficient material toughness to accomplish this alone.

According to the invention, a pipeline fracture-arresting device comprises, a cylindrical sleeve of greater diameter than the pipeline arranged to be positioned substantially concentrically around a region of the pipeline so as to define an annular space therebetween which is bridged by annular support means.

The support means may be provided by a filling of a suitable material having a high compressive strength.

Alternatively, the support means can be provided by two inwardly extending annular plates fixed one at each end thereof, the assembly thus formed being arranged to be positioned around a region of the pipeline so as to define a closed annular space therebetween.

In some cases the annular plates can be arranged to engage the outer surface of the pipeline so as effectively to restrict any appreciable expansion of the pipeline beyond the points of engagement thereby also to arrest any further propagation of a split or fracture in the pipeline.

In other cases the annular end plates of the aforesaid assembly of sleeve and end plates, can have inside diameters slightly greater than the outside diameter of the pipeline to which the assembly is fitted for ease of application, the annular space therebetween being filled with a filling of a suitable material having a high compressive strength.

In a simpler arrangement in accordance with the invention, the arrester device could conveniently consist of two annular plates suitably fixed on the external surface of the pipeline and spaced apart by the spacer means which effectively constitutes said sleeve.

For most purposes, the section of a pipeline to be protected against the propagation of fractures will be provided with a number of such arrester devices spaced at predetermined intervals along its length before laying the pipeline, and the invention includes within its scope, pipelines (or sections thereof) incorporating such devices. The maximum length of a propagation fracture in a pipe would, under these circumstances, be that of the distance between two adjacent arrester devices.

In other cases, existing pipeline installations can be protected by fitting such arrester devices to the already laid pipeline, in which case, they will be formed in two halves which can be rigidly fixed together after assembly around the installed pipeline and then, in appropriate cases, filled with filling material having a high compressive strength.

It is a matter of pipe replacement philosophy, following fracture damage as to what distance apart the devices should be placed along the pipeline. One approach is to base this on the number of pipes that can be replaced in a 24 hour period by one contractural unit. Assuming this to be the case, the density of arrester devices would perhaps be ten or twelve per mile. It is thought that the manufacturing and installation of such devices as described are economically viable within this constraint.

Figure 2:
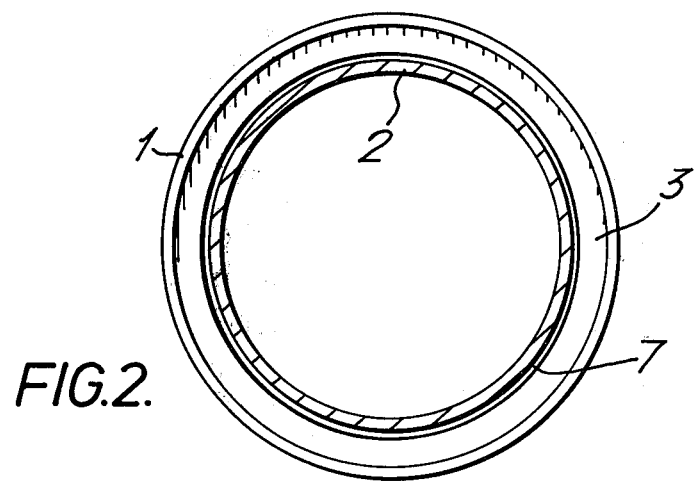

Several embodiments of an arrester device in accordance with the present invention will now be described by way of example with reference to the accompanying diagrammatic drawing in which:

FIG. 1 is a longitudinal section of an arrester device of a first embodiment applied to a pipeline, FIG. 2 is an end elevation of FIG. 1, FIGS. 3, 4 and 5 are fragmentary sections respectively of three alternative embodiments.

Basically, the preferred embodiment is as shown in FIGS. 1 and 2 and essentially comprises a short section of line pipe in the form of a sleeve 1 concentrically located around the gas line pipe 2 but spaced therefrom by means of radial closure plates 3 and 4 of approximately 0.1 d. depth (where d=outer diameter of the pipeline 2) which are welded at 5 to the sleeve 1 and have an inside rim diameter slightly greater than the pipeline 2 over which they are located. These radial closure plates 3 and 4, together with the spaced sleeve 1, define between them and the pipeline 2, a closed annular space which is filled with grout 6, a slight gap 7 being maintained between each said inner rim of the plates 3, 4 and the pipeline 2. These gaps 7 are approximately 0.1 d and are necessary to avoid damage to the usual protective coating of the pipeline, besides facilitating the fitting of the assembly over the pipeline.

Since, in this embodiment, it is the function of both the radial closure plates 3 and 4, and the grout filled annulus 6, to stop the pipe kinematics associated with the fracture and thereby stop the fracture, the gaps 7 must not be such as to prevent this.

Figure 3:
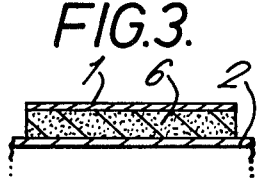

In the modification shown in FIG. 3, the radial closure plates of the first embodiment are not used, the arrest of pipe fracture relying solely on the combination of sleeve 1 and grout 6.

Figure 4:
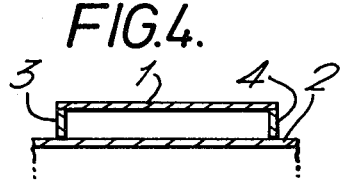

In the modification shown in FIG. 4, the spaced radial closure plates 3 and 4 are a closer fit on the pipeline 2 than those of the first embodiment and are rigidly connected to one another by the sleeve 1. Alternatively, in the modification shown in FIG. 5, said rigid connection of the plates 3 and 4 can be made by means of a welded spacer or possibly tie-rods, shown in chain dotted lines.

Figure 5:
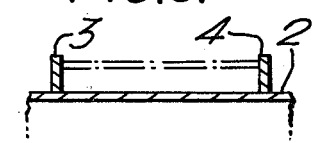

These particular modified devices shown in FIGS. 3, 4 and 5 are conservative in that the grout filled annulus (see the modification shown in FIG. 3) or the closer fitting radial closure plates (see modifications shown in FIG. 4 and 5 respectively) would be adequate to fulfil an arrester function. Such a curtailment of components would lessen its installation and fabrication costs.

Particular advantages of such arrester devices in accordance with the various aspects of the invention can be summarised as follows:

(a) The device is insensitive to orientation of fracture, that is to say, it would function equally well irrespective of whether or not the fracture approach was on the top, bottom or anywhere between these pipe positions.

(b) The installation of the device does not entail any damage to the corrosion protective coating of the pipe.

(c) Where it is essential in some installations, there is not metallic connection between the device and the pipeline itself which could otherwise give rise to corrosion due to electrolytic action, and against which the pipeline installation could include cathodic protection.

(d) The annular filling can be of any suitable material which has a high compressibility and not necessarily one associated with a high tensile strength. Practical fillings such as concrete or cement would be suitable for this role.

(e) The device is not large, typical dimensions in terms of a gas transmission line diameter are shown in FIG. 1. The most important dimension is the length of the device, which at 1.25 times the diameter of the pipeline is adequate to absorb the kinematics of the fracturing pipe.

(f) The device is self contained in that no other appendages are necessary.

(g) The capability of such devices to arrest fractures is independent of the media in which the gas pipe itself is placed.

What we claim is:

1. In combination, a pipeline and a pipeline fracture-arresting means for arresting fractures in said pipeline, said fracture-arresting means comprising: a single cylindrical sleeve of greater diameter than the pipeline and positioned substantially concentrically around a continuous region of the pipeline so as to define an annular space therebetween, and an annular support means for bridging said annular space, said annular support means comprising a filling of a material having a high compressive strength and being bonded to the internal surface of the sleeve and the external surface of the pipeline, respectively, and two inwardly extending annular plates fixed one at each end of the sleeve, each annular plate having an inside diameter slightly greater than the outside diameter of the pipeline so that the innermost edge thereof is spaced from the external surface of the pipeline.

* * * * *